United States Patent
Yin et al.

(10) Patent No.: US 9,911,382 B2
(45) Date of Patent: Mar. 6, 2018

(54) DISPLAY ARRAY SUBSTRATE, COMPENSATION METHOD, DISPLAY PANEL AND DISPLAY DEVICE

(71) Applicant: BOE TECHNOLOGY GROUP CO., LTD., Beijing (CN)

(72) Inventors: Xinshe Yin, Beijing (CN); Ying Wang, Beijing (CN); Guang Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 57 days.

(21) Appl. No.: 14/893,777

(22) PCT Filed: May 12, 2015

(86) PCT No.: PCT/CN2015/078740
§ 371 (c)(1),
(2) Date: Nov. 24, 2015

(87) PCT Pub. No.: WO2016/095414
PCT Pub. Date: Jun. 23, 2016

(65) Prior Publication Data
US 2016/0358545 A1    Dec. 8, 2016

(30) Foreign Application Priority Data
Dec. 18, 2014    (CN) .......................... 2014 1 0796084

(51) Int. Cl.
*G09G 3/32*    (2016.01)
*G09G 3/30*    (2006.01)
(Continued)

(52) U.S. Cl.
CPC ............. *G09G 3/3233* (2013.01); *G06F 1/26* (2013.01); *G09G 3/3208* (2013.01);
(Continued)

(58) Field of Classification Search
CPC ........ G06F 1/26; G06F 1/3262; G06F 1/3265; G06F 3/0416; G06F 2217/78;
(Continued)

(56) References Cited

U.S. PATENT DOCUMENTS

2002/0011976 A1    1/2002    Hashimoto
2006/0221007 A1    10/2006   Kim
(Continued)

FOREIGN PATENT DOCUMENTS

CN    1816836 A    8/2006
CN    1930603 A    3/2007
(Continued)

OTHER PUBLICATIONS

Second Office Action regarding Chinese application No. 201410796084.4, dated Dec. 14, 2016. Translation provided by Dragon Intellectual Property Law Firm.
(Continued)

*Primary Examiner* — Dismery Mercedes
(74) *Attorney, Agent, or Firm* — Harness, Dickey & Pierce, P.L.C.

(57) ABSTRACT

The present disclosure provides a display array substrate, a compensation method, a display panel and a display device. The display array substrate includes at least one power line and a voltage application unit. The at least one power line is connected to pixels in at least one column within an effective display region on the display array substrate. The power application unit is arranged outside the effective display region and configured to apply power supply voltages to at least two power supply voltage input points on the at least one power line. An absolute value of a voltage difference between the at least two power supply voltage input points is less than a predetermined voltage threshold.

19 Claims, 4 Drawing Sheets

(51) Int. Cl.
*G09G 3/3233* (2016.01)
*G09G 3/3208* (2016.01)
*G09G 3/3225* (2016.01)
*G09G 3/3258* (2016.01)
*G06F 1/26* (2006.01)

(52) U.S. Cl.
CPC ......... *G09G 3/3225* (2013.01); *G09G 3/3258* (2013.01); *G09G 2300/0426* (2013.01); *G09G 2300/0842* (2013.01); *G09G 2320/0204* (2013.01); *G09G 2320/0233* (2013.01); *G09G 2320/0242* (2013.01); *G09G 2330/028* (2013.01)

(58) Field of Classification Search
CPC ......... G09G 2330/00; G09G 2330/028; G09G 2330/021; G09G 3/3233; G09G 3/3258; G09G 3/3696; G09G 3/3225; G09G 2320/0233; G09G 2320/0204; G09G 2320/0242; G09G 2320/045; G09G 2300/08; G09G 2300/0819
See application file for complete search history.

(56) References Cited

U.S. PATENT DOCUMENTS

| | | | | |
|---|---|---|---|---|
| 2008/0246702 A1* | 10/2008 | Lee | ................ | G09G 3/3233 345/77 |
| 2009/0140661 A1* | 6/2009 | Park | ................ | G09G 3/3225 315/169.3 |
| 2011/0043505 A1* | 2/2011 | Ahn | ................ | H02M 3/07 345/211 |
| 2011/0279433 A1* | 11/2011 | Ryu | ................ | G09G 3/3233 345/211 |
| 2011/0298782 A1* | 12/2011 | Park | ................ | G09G 3/3225 345/212 |
| 2011/0316838 A1* | 12/2011 | Ahn | ................ | G09G 3/3225 345/211 |
| 2012/0161637 A1* | 6/2012 | Lee | ................ | G09G 3/32 315/122 |
| 2013/0249420 A1* | 9/2013 | Lee | ................ | H05B 33/0827 315/192 |
| 2014/0368416 A1* | 12/2014 | Gu | ................ | G09G 3/3233 345/78 |
| 2015/0255017 A1* | 9/2015 | Kim | ................ | G09G 3/3258 315/172 |

FOREIGN PATENT DOCUMENTS

| | | |
|---|---|---|
| CN | 101030354 A | 9/2007 |
| CN | 101983397 A | 3/2011 |
| CN | 102081903 A | 6/2011 |
| CN | 202166908 U | 3/2012 |
| CN | 103927968 A | 7/2014 |
| CN | 104050915 A | 9/2014 |
| CN | 104409046 A | 3/2015 |
| CN | 204257177 U | 4/2015 |

OTHER PUBLICATIONS

First Office Action regarding Chinese application No. 201410796084.4, dated Apr. 5, 2016. Translation provided by Dragon Intellectual Property Law Firm.

Written Opinion of the International Searching Authority for international application No. PCT/CN2015/078740.

Fourth Chinese Office Action regarding Application No. 201410796084.4 dated Nov. 10, 2017. English translation provided by http://globaldossier.uspto.gov.

* cited by examiner

DISPLAY ARRAY SUBSTRATE, COMPENSATION METHOD, DISPLAY PANEL AND DISPLAY DEVICE

This application is the U.S. national phase of PCT Application No. PCT/CN2015/078740 filed on May 12, 2015, which claims a priority of the Chinese Patent Application No. 201410796084.4 filed on Dec. 18, 2014, the disclosures of which are incorporated in their entirety by reference herein.

TECHNICAL FIELD

The present disclosure relates to the field of an organic light-emitting diode (OLED) display technology, in particular to a display array substrate, a compensation method, a display panel and a display device.

BACKGROUND

Active matrix/organic light-emitting diode (AMOLED) display device is currently one of the hotspots in the field of flat-panel display devices. The OLED has such advantages as low power consumption, low production cost, self-luminescence, wide viewing angle and rapid response. As a core technique for the AMOLED display device, the design of a pixel driving circuit is of an important significance. For the AMOLED display device, a stable current is required so as to control the OLED to emit light.

Figure 1:
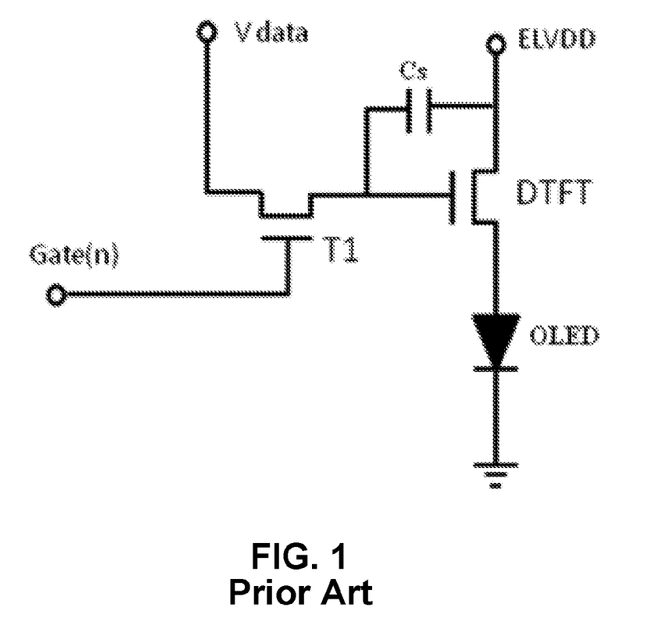
FIG. 1 is a circuit diagram of an existing typical AMOLED pixel driving circuit.

As shown in FIG. 1, an existing typical AMOLED pixel driving circuit includes one driving transistor DTFT, one switching transistor T1 and one storage capacitor Cs. When one row of scanning lines is selected, a scanning signal Gate(n) on this row is of a low level, T1 is turned on, and a data voltage Vdata corresponding a grayscale level is written into the storage capacitor Cs. After this row of scanning lines has been scanned, Gate(n) is changed to be of a high level, T1 is turned off, and DTFT is driven by a gate voltage stored in Cs, so that a current is generated by DTFT to drive the OLED, thereby to ensure the OLED to emit light continuously within one frame. The current $I_{OLED}$ flowing through the OLED=$K(V_{GS}-V_{th})^2$=$K(V_{data}-ELVDD-V_{th})^2$, wherein K is a constant, $V_{GS}$ is a gate-to-source voltage of DTFT, $V_{th}$ is a threshold voltage of DTFT, and ELVDD is a power supply voltage. An existing pixel compensation circuit merely compensates for the drift of the threshold voltage $V_{th}$ of DTFT in each pixel generated due to the manufacture process and the aging of elements.

Figure 2:
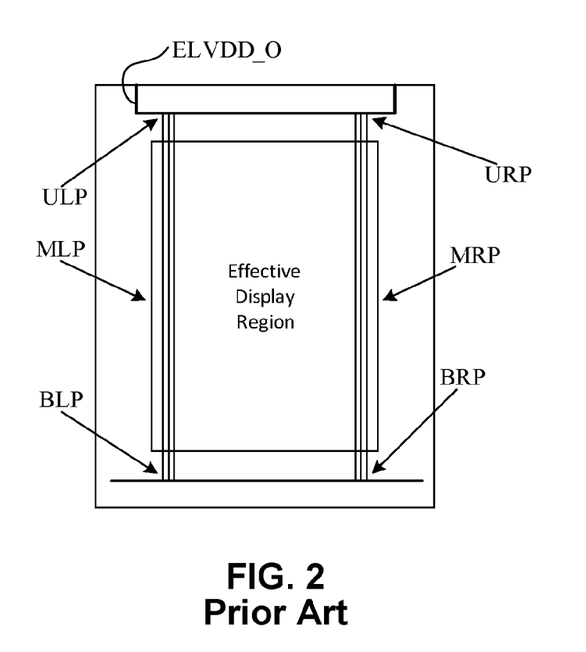
FIG. 2 is a schematic view showing power lines for applying a power supply voltage ELVDD and power supply leads arranged outside an effective display region on an existing OLED display panel.

However, it should be appreciated that, as can be seen from the above equation for calculating the current flowing through the OLED, the current is also affected by the power supply voltage ELVDD. Because the OLED is a current-driven element, there is a relatively large current flowing through a power line for applying the power supply voltage ELVDD. As shown in FIG. 2, on an OLED display panel, the pixels in each column within an effective display region are connected to a corresponding power line, and the power supply voltage is applied by a power supply lead ELVDD_O located outside the effective display region to the power lines within the effective display region. The large current flows through, from top down, the power lines within the effective display region, so on the OLED display panel, the power supply voltage ELVDD at an upper left portion is larger than that at a middle left portion, and the power supply voltage ELVDD at the middle left portion is larger than that at a bottom left portion. Identically, the power supply voltage ELVDD at an upper right portion is larger than that at a middle right portion, and the power supply voltage ELVDD at the middle right portion is larger than that at a bottom right portion.

In FIG. 2, a first power supply voltage input point BLP is located on the OLED display panel at the bottom left, a second power supply voltage input point ULP is located on the OLED display panel at the upper left, a third power supply voltage input point URP is located on the OLED display panel at the upper right, a fourth power supply voltage input point BRP is located on the OLED display panel at the bottom right, a fifth power supply voltage input point MLP is located on the OLED display panel at the middle left, and a sixth power supply voltage input point MRP is located on the OLED display panel at the middle right. VULP>VMLP>VBLP, VURP>VMRP>VBRP, wherein VULP is a voltage at ULP, VMLP is a voltage at MLP, VBLP is a voltage at BLP, VURP is a voltage at URP, VMRP is a voltage at MRP, and VBRP is a voltage at BRP.

As can be seen from the above equation for calculating the current flowing through the OLED, the brightness of the entire OLED display panel gradually increases from top down, i.e., the brightness unevenness occurs. In the related art, an appropriate material is selected so as to reduce a resistance of the power line for applying the ELVDD, thereby to reduce a difference in an IR drop (which refers to a voltage drop or rise across a network in an existing integrated circuit (IC) between the power supply and the ground). However, along with an increase in the resolution, there is less room for the power lines, and as a result, the IR drop become very serious on the OLED display panel.

SUMMARY

A main object of the present disclosure is to provide a display array substrate, a compensation method, a display panel and a display device, so as to prevent a difference in currents flowing through a driving transistor of a light-emitting element due to a difference in power supply voltages applied to pixels, thereby to prevent a difference in brightness of the pixels on the display panel.

In one aspect, the present disclosure provides in one embodiment a display array substrate including at least one power line and a voltage application unit.

The at least one power line is connected to pixels in at least one column within an effective display region on the display array substrate. The power application unit is arranged outside the effective display region and configured to apply power supply voltages to at least two power supply voltage input points on the at least one power line. An absolute value of a voltage difference between the at least two power supply voltage input points is less than a predetermined voltage threshold.

Alternatively, the pixels in each column within the effective display region are connected to a corresponding power line, and the voltage application unit is configured to apply the power supply voltages to at least two power supply voltage input points on each power line on the display array substrate.

Alternatively, when the power supply voltages are applied by the voltage application unit to two power supply voltage input points on the power line, the two power supply voltage input points are located at the top and the bottom of the power line, respectively.

Alternatively, when the power supply voltages are applied by the voltage application unit to three power supply voltage input points on the power line, the three power supply voltage input points are located at the top, the middle and the bottom of the power line, respectively.

Alternatively, the voltage difference between the at least two power supply voltage input points is zero.

Alternatively, the voltage application unit includes a direct current (DC)/DC converter and a DC voltage source configured to generate a DC voltage. An input end of the DC/DC converter is configured to receive the DC voltage. The DC/DC converter includes at least two output ends corresponding to the at least two power supply voltage input points, respectively, and it is configured to generate a corresponding power supply voltage in accordance with an impedance between each output end and the corresponding power supply voltage input point, and apply the power supply voltage through the output end to the corresponding power supply voltage input point.

Alternatively, the DC/DC converter includes at least two DC/DC conversion units corresponding to the at least two power supply voltage input points, respectively. The DC/DC conversion unit includes a low drop-out regulator (LDO), a positive phase input end of which is configured to receive the DC voltage, a negative phase input end of which is connected to an output end of the low drop-out regulator through a first divider resistor and grounded through a second divider resistor, and an output end of which is connected to the corresponding power supply voltage input point.

Alternatively, the voltage application unit includes at least two variable resistors corresponding to the at least two power supply voltage input points, respectively, and a DC voltage source for generating a DC voltage. A first end of the variable resistor is configured to receive the DC voltage, and a second end of the variable resistor is connected to the corresponding power supply voltage input point.

Alternatively, the voltage application unit is further configured to apply the power supply voltages to the at least two power supply voltage input points on the power line via at least two external power supply leads within a wiring region on the display array substrate.

Alternatively, the power supply voltage is applied to the power supply voltage input points on at least partial of different power lines via an identical external power supply lead.

Alternatively, the display array substrate is an OLED array substrate.

In another aspect, the present disclosure provides in one embodiment a compensation method for a display array substrate, including steps of: enabling pixels in at least one column within an effective display region on the display array substrate to be connected to at least one power line; selecting at least two power supply voltage input points on the at least one power line on the display array substrate; and applying power supply voltages to the at least two power supply voltage input points, an absolute value of a voltage difference between the at least two power supply voltage input points being less than a predetermined voltage threshold.

Alternatively, when the power supply voltages are applied to two power supply voltage input points on the power line, the two power supply voltage input points are located at the top and the bottom of the power line, respectively.

Alternatively, when the power supply voltages are applied to three power supply voltage input points on the power line, the three power supply voltage input points are located at the top, the middle and the bottom of the power line, respectively.

Alternatively, the voltage difference between the at least two power supply voltage input points is zero.

Alternatively, the power supply voltages are applied to the at least two power supply voltage input points on the power line via at least two external power supply leads, respectively.

Alternatively, the step of applying the power supply voltages to the at least two power supply voltage input points includes: applying the power supply voltages to the at least two power supply voltage input points on each power line on the display array substrate.

Alternatively, the power supply voltage is applied to the power supply voltage input points on at least partial of different power lines via an identical external power supply lead.

In yet another aspect, the present disclosure provides in one embodiment a display panel including the above-mentioned display array substrate.

In still yet another aspect, the present disclosure provides in one embodiment a display device including the above-mentioned display array substrate or display panel.

According to the display array substrate, the compensation method, the display panel and the display device in the embodiments of the present disclosure, the power supply voltages are applied by the voltage application unit arranged outside the effective display region of the display array substrate to the at least two power supply voltage input points on the at least one power line on the display array substrate, and the absolute value of the voltage difference between the at least two power supply voltage input points is less than the predetermined voltage threshold. As a result, it is able to prevent a difference in currents flowing through a driving transistor of a light-emitting element due to a difference in the power supply voltages applied to pixels, thereby to prevent a difference in brightness of the pixels on the display panel.

DETAILED DESCRIPTION

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

The present disclosure provides in one embodiment a display array substrate which includes at least one power line and a voltage application unit. The at least one power line is connected to pixels in at least one column within an effective display region on the display array substrate. The power application unit is arranged outside the effective display region and configured to apply power supply voltages to at least two power supply voltage input points on the at least power line. An absolute value of a voltage difference between the at least two power supply voltage input point is less than a predetermined voltage threshold.

Alternatively, the voltage difference between the at least two power supply voltage input points is zero.

According to the display array substrate in the embodiment of the present disclosure, the power supply voltages are applied by the voltage application unit arranged outside the effective display region of the display array substrate to the at least two power supply voltage input points on the at least one power line on the display array substrate, and the absolute value of the voltage difference between the at least two power supply voltage input points is less than the predetermined voltage threshold. As a result, it is able to prevent a difference in currents flowing through a driving transistor of a light-emitting element due to a difference in the power supply voltages applied to pixels, thereby to prevent a difference in brightness of the pixels on the display panel.

Alternatively, the pixels in each column within the effective display region are connected to a power line, and the voltage application unit is configured to apply the power supply voltages to at least two power supply voltage input points on each power line on the display array substrate. In this way, it is able to prevent the brightness difference for the pixels in each column on the display array substrate.

Alternatively, when the power supply voltages are applied by the voltage application unit to two power supply voltage input points on the power line, the two power supply voltage input points are located at the top and the bottom of the power line, respectively.

Alternatively, when the power supply voltages are applied by the voltage application unit to three power supply voltage input points on the power line, the three power supply voltage input points are located at the top, the middle and the bottom of the power line, respectively.

Figure 3:
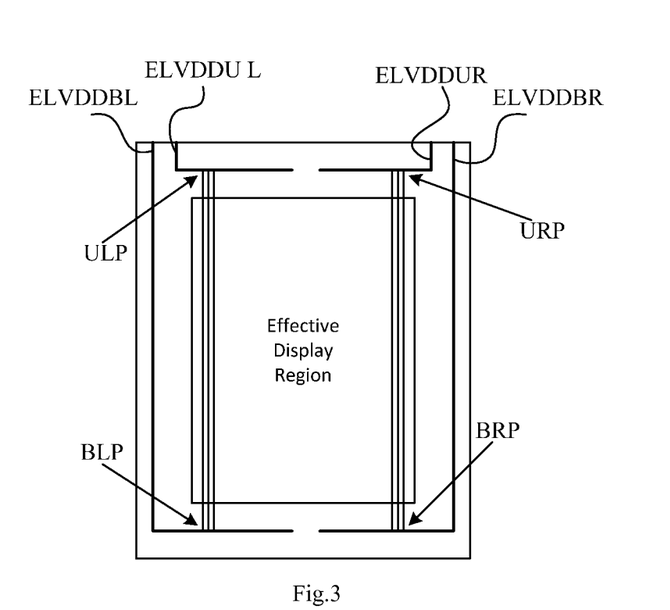
FIG. 3 is a schematic view showing power lines for applying a power supply voltage ELVDD and external power supply leads arranged at a wiring region on a display array substrate according to one embodiment of the present disclosure.

Alternatively, the voltage application unit is further configured to apply the power supply voltages to the at least two power supply voltage input points on the power line via at least two external power supply leads within a wiring region on the display array substrate. In this way, it is able to enable the absolute value of the voltage difference between the at least two power supply voltage input points on the power line to be less than the predetermined threshold voltage, thereby to prevent the difference in the currents flowing through the driving transistor of the light-emitting element due to the difference in the power supply voltages applied to the pixels, and prevent the difference in the brightness of the pixels on the display panel. As shown in FIG. 3, when designing the display array substrate, the power supply voltages are applied by the voltage application unit (not shown) located outside the effective display region of the display array substrate to a first power supply voltage input point BLP, a second power supply voltage input point ULP, a third power supply voltage input point URP and a fourth power supply voltage input point BRP via a first external power supply lead ELVDDBL, a second external power supply lead ELVDDUL, a third external power supply lead ELVDDUR and a fourth external power supply lead ELVDDBR, respectively.

All the pixels in each column within the effective display region of the display array substrate connected to the power line extending in a vertical direction. The first power supply voltage input point BLP is located at the bottom left of the display array substrate, the second power supply voltage input point ULP is located at the upper left of the display array substrate, the third power supply voltage input point URP is located at the upper right of the display array substrate, and the fourth power supply voltage input point BRP is located at the bottom right of the display array substrate.

It should be appreciated that, referring to FIG. 3, the entire display array substrate is divided into two portions, i.e., a left portion and a right portion. When two power supply voltage input points are selected from each power line, they may be located at the top and bottom of the power line, respectively. In this way, the power lines at the left portion correspond to the first power supply voltage input point BLP and the second power supply voltage input point ULP, and the power lines at the right portion correspond to the third power supply voltage input point URP and the fourth power supply voltage input point BRP.

During the actual operation, there is a voltage difference $\Delta V$ between the power supply voltage input points. In FIG. 3, the power supply voltage is applied to BLP via ELVDDBL, the power supply voltage is applied to ULP via ELVDDUL, the power supply voltage is applied to URP via ELVDDUR, and the power supply voltage is applied to BRP via ELVDDBR. In the case that the same voltage is applied to ELVDDBL and ELVDDUL, the voltage difference between BLP and ULP is just a difference between voltage drops on ELVDDUL and ELVDDBL. Generally, ELVDDBL=ELVDDUL+AVL, wherein AVL represents a voltage drop on the ELVDDBL, so the voltage applied to BLP is identical to that applied to ULP. Similarly, ELVDDBR=ELVDDUR+AVR, wherein AVR represents a voltage drop on the ELVDDBR, so the voltage applied to BRP is identical to that applied to URP. Meanwhile, resistances of the external power supply leads need to be as small as possible, so as to reduce the voltage drops on the two or more external power supply leads, reduce the voltage difference between the power supply voltage input points and reduce the desired maximum power supply voltage, thereby to reduce the power consumption.

Alternatively, the power supply voltage is applied to the power supply voltage input points on at least partial of different power lines via an identical external power supply lead.

In an alternative embodiment, the power supply voltage may be applied to the second power supply voltage input point ULP at the upper left of the display array substrate and the third power supply voltage input point URP at the upper right of the display array substrate via an identical power supply lead, and/or the power supply voltage may be applied to the first power supply voltage input point BLP at the bottom left of the display array substrate and the fourth power supply voltage input point BRP at the bottom right of the display array substrate via an identical power line. In other words, the power supply voltage input points at an identical level at the left and right portions of the display array substrate may be connected to an identical power supply lead, so as to simplify the wiring. It should be appreciated that, referring to FIG. 3, the power supply voltage may be also applied to the power supply voltage input points ULPs on the power lines at the left portion via an identical power supply lead ELVDDUL, and the power supply voltage may also be applied to the power supply voltage input points URPs on the power lines at the right portion via an identical power supply lead EVLDDUR. In a word, the power supply voltage is applied to the power supply voltage input points on different power lines via an identical external power supply lead, so as to simply the wiring.

During the actual operation, along with an increase in the size of the display array substrate or in the resistance of the power line, it is unable to compensate for the IR voltage drop on ELVDD through the four power supply voltage input points, and in this case, six, eight or more power supply voltage input points may be provided.

Figure 3A:
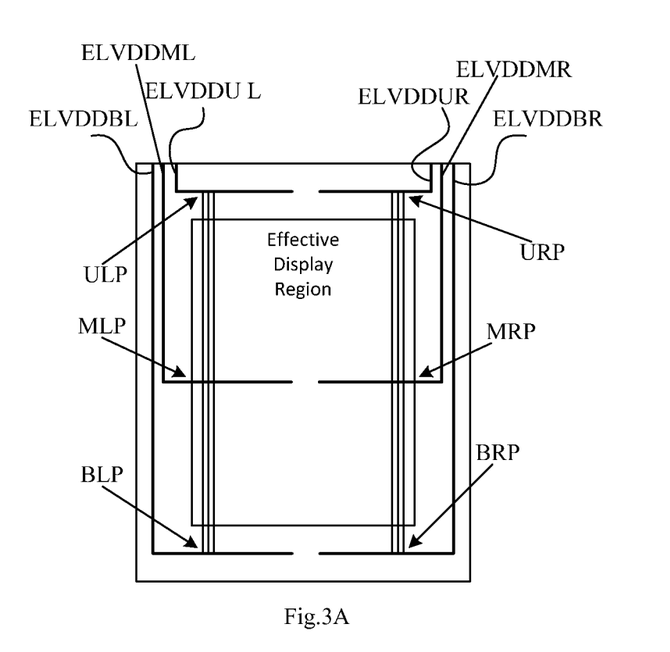
FIG. 3A is another schematic view showing the power lines for applying the power supply voltage ELVDD and the external power supply leads arranged at the wiring region on the display array substrate according to one embodiment of the present disclosure.

For example, as shown in FIG. 3A, two additional power supply voltage input points are provided, i.e., a fifth power supply voltage input point MLP located at the middle left of the display array substrate, and a sixth power supply voltage input point MRP located at the middle right of the display array substrate.

In addition, the voltage application unit includes a DC/DC converter and a DC voltage source configured to generate a DC voltage. An input end of the DC/DC converter is configured to receive the DC voltage. The DC/DC converter includes at least two output ends corresponding to the at least two power supply voltage input points, respectively, and it is configured to generate a corresponding power supply voltage in accordance with an impedance between each output end and the corresponding power supply voltage input point, and apply the power supply voltage through the output end to the corresponding power supply voltage input point.

Figure 4:
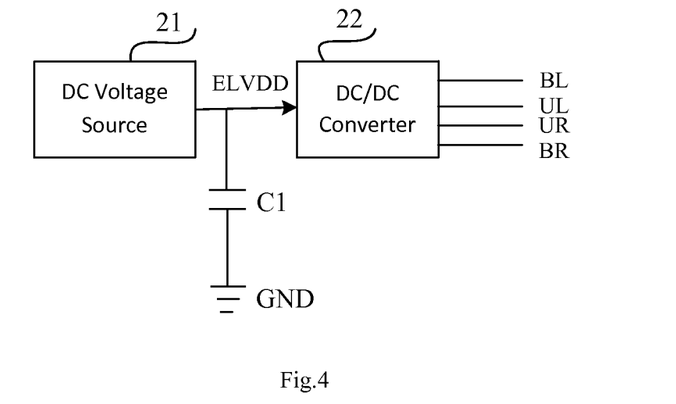
FIG. 4 is a schematic view showing a voltage application unit in the display array substrate according to one embodiment of the present disclosure.

To be specific, as shown in FIG. 4, the voltage application unit includes a DC voltage source 21 for generating a DC voltage ELVDD and a DC/DC converter 22. An input end of the DC/DC converter 22 is configured to receive the DC voltage ELVDD generated by the DC voltage source 21. A DC voltage output end of the DC voltage source is connected to a grounded end GND via a first capacitor C1, so as to be insulated from an alternating current (AC) voltage. The DC/DC converter 22 includes a first output end BL corresponding to the first power supply voltage input point BLP, a second output end UL corresponding to the second power supply voltage input point ULP, a third output end UR corresponding to the third power supply voltage input point URP, and a fourth output end BR corresponding to the fourth power supply voltage input point BRP. The DC/DC converter 22 is configured to generate a first power supply voltage in accordance with an impedance between the first output end BL and the first power supply voltage input point BLP, and apply the first power supply voltage to the first power supply voltage input point BLP through the first output end BL and the first external power supply lead ELVDDBL; generate a second power supply voltage in accordance with an impedance between the second output end UL and the second power supply voltage input point ULP, and apply the second power supply voltage to the second power supply voltage input point ULP through the second output end UL and the second external power supply lead ELVDDUL; generate a third power supply voltage in accordance with an impedance between the third output end UR and the third power supply voltage input point URP, and apply the third power supply voltage to the third power supply voltage input point URP through the third output end UR and the third external power supply lead ELVDDUR; and generate a fourth power supply voltage in accordance with an impedance between the fourth output end BR and the fourth power supply voltage input point BRP, and apply the fourth power supply voltage to the fourth power supply voltage input point BRP through the fourth output end BR and the fourth external power supply lead ELVDDBR.

Generally, the DC voltage ELVDD generated by the DV voltage source 21 is 0.1V greater than a maximum one of a voltage at the first output end BL, a voltage at the second output end UL, a voltage at the third output end UR and a voltage at the fourth output end BR. In order to reduce the power consumption, the DC/DC converter may include four efficient bucking circuits, and meanwhile it is able for each circuit to adjust its output voltage.

Alternatively, the DC/DC converter includes at least two DC/DC conversion units corresponding to the at least two power supply voltage input points, respectively. The DC/DC conversion unit includes a low drop-out regulator (LDO), a positive phase input end of which is configured to receive the DC voltage, a negative phase input end of which is connected to an output end of the low drop-out regulator through a first divider resistor and grounded through a second divider resistor, and the output end of which is connected to the corresponding power supply voltage input point.

Figure 5:
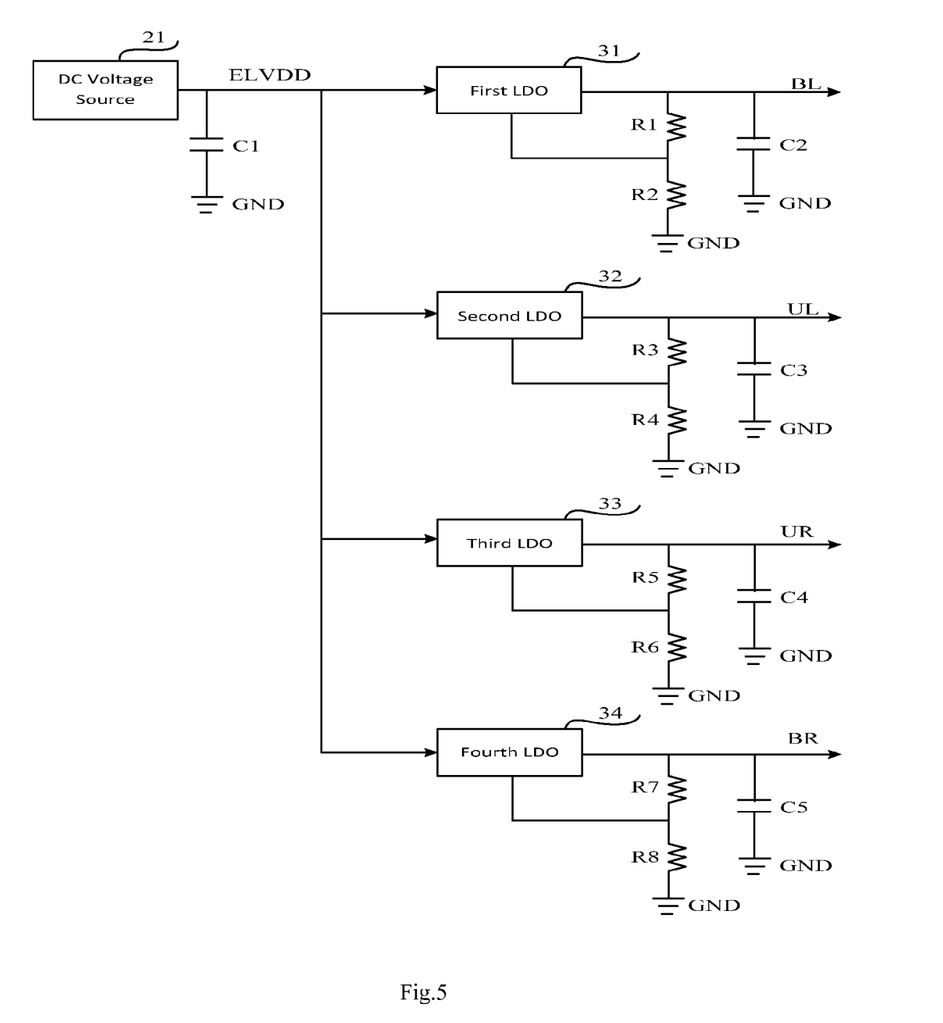
FIG. 5 is another schematic view showing the voltage application unit in the display array substrate according to one embodiment of the present disclosure.

To be specific, as shown in FIG. 5, the DC/DC converter may include a first DC/DC conversion unit, a second DC/DC conversion unit, a third DC/DC conversion unit and a fourth DC/DC conversion unit.

The first DC/DC conversion unit includes a first LDO 31, a first resistor R1 and a second resistor R2. A positive phase input end of the first LDO 31 is configured to receive the DC voltage ELVDD, and a negative phase input end thereof is connected to an output end of the LDO 31 via the first resistor R1 and connected to the grounded end GND via the second resistor R2. The output end of the first LDO 31 serves as the first output end BL of the DC/DC converter 22 and is connected to the grounded end GND via a second capacitor C2.

The second DC/DC conversion unit includes a second LDO 32, a third resistor R3 and a fourth resistor R4. A positive phase input end of the second LDO 32 is configured to receive the DC voltage ELVDD, and a negative phase input end thereof is connected to an output end of the second LDO 32 via the third resistor R3 and connected to the grounded end GND via the fourth resistor R4. The output end of the second LDO 32 serves as the second output end UL of the DC/DC converter 22 and is connected to the grounded end GND via a third capacitor C3.

The third DC/DC conversion unit includes a third LDO 33, a fifth resistor R5 and a sixth resistor R6. A positive phase input end of the third LDO 33 is configured to receive the DC voltage ELVDD, and a negative phase input end thereof is connected to an output end of the third LDO 33 via the fifth resistor R5 and connected to the grounded end GND via the sixth resistor R6. The output end of the third LDO 33 serves as the third output end UR of the DC/DC converter 22 and is connected to the grounded end GND via a fourth capacitor C4.

The fourth DC/DC conversion unit includes a fourth LDO 34, a seventh resistor R7 and an eighth resistor R8. A positive phase input end of the fourth LDO 34 is configured to receive the DC voltage ELVDD, and a negative phase input end thereof is connected to an output end of the fourth LDO 34 via the seventh resistor R7 and connected to the grounded end GND via the eighth resistor R8. The output end of the fourth LDO 34 serves as the fourth output end BR of the DC/DC converter 22 and is connected to the grounded end GND via a fifth capacitor C5.

In the embodiment as shown in FIG. 5, resistances of R1, R3, R5 and R7 may be adjusted so as to enable the voltages applied to the four power supply voltage input points of the display array substrate (i.e., the first power supply voltage input point BLP at the bottom left of the display array substrate, the second power supply voltage input point ULP at the upper left of the display array substrate, the third power supply voltage input point URP at the upper right of the display array substrate, and the fourth power supply voltage input point BRP at the bottom right of the display array substrate) to be identical or similar to each other.

Alternatively, the voltage application unit includes at least two variable resistors corresponding to the at least two power supply voltage input points, respectively, and a DC voltage source for generating a DC voltage. A first end of the variable resistor is configured to receive the DC voltage, and a second end of the variable resistor is connected to the corresponding power supply voltage input point.

Figure 6:
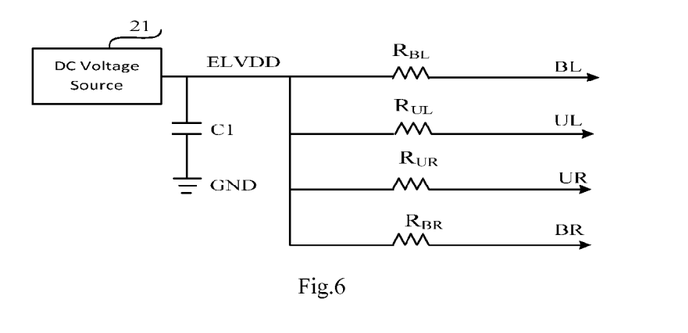
FIG. 6 is yet another schematic view showing the voltage application unit in the display array substrate according to one embodiment of the present disclosure.

To be specific, as shown in FIG. 6, the voltage application unit includes a DC voltage source 21 for generating the DC voltage ELVDD, a first variable resistor RBL, a second variable resistor RUL, a third variable resistor RUR and a fourth variable resistor RBR. A first end of the first variable resistor RBL is configured to receive the DC voltage ELVDD, and a second end thereof, as the first output end BL of the DC/DC converter 22, is connected to the first power supply voltage input point. A first end of the second variable resistor RUL is configured to receive the DC voltage ELVDD, and a second end thereof, as the second output end UL of the DC/DC converter 22, is connected to the second power supply voltage input point. A first end of the third variable resistor RUR is configured to receive the DC voltage ELVDD, and a second end thereof, as the third output end UR of the DC/DC converter 22, is connected to the third power supply voltage input point. A first end of the fourth variable resistor RBR is configured to receive the DC voltage ELVDD, and a second end thereof, as the fourth output end BR of the DC/DC converter 22, is connected to the fourth power supply voltage input point.

In the embodiment as shown in FIG. 6, resistances of the first variable resistor RBL, the second variable resistor RUL, the third variable resistor RUR and the fourth variable resistor RBR may be adjusted so as to enable the voltages applied to the four power supply voltage input points of the display array substrate (i.e., the first power supply voltage input point BLP at the bottom left of the display array substrate, the second power supply voltage input point ULP at the upper left of the display array substrate, the third power supply voltage input point URP at the upper right of the display array substrate, and the fourth power supply voltage input point BRP at the bottom right of the display array substrate) to be identical or similar to each other.

The display array substrate may be a liquid crystal array substrate, an OLED array substrate or any other display array substrate.

During the actual operation, alternatively, the display array substrate is an OLED array substrate, so as to compensate for the IR voltage drop in a better manner.

The present disclosure further provides in one embodiment a compensation method for a display array substrate, which includes steps of: enabling pixels in at least one column within an effective display region on the display array substrate to be connected to at least one power line; selecting at least two power supply voltage input points on the at least one power line on the display array substrate; and applying power supply voltages to the at least two power supply voltage input points, an absolute value of a voltage difference between the at least two power supply voltage input points being less than a predetermined voltage threshold.

Alternatively, when the power supply voltages are applied to two power supply voltage input points on the power line, the two power supply voltage input points are located at the top and the bottom of the power line, respectively.

Alternatively, when the power supply voltages are applied to three power supply voltage input points on the power line, the three power supply voltage input points are located at the top, the middle and the bottom of the power line, respectively.

Alternatively, the voltage difference between the at least two power supply voltage input points is zero.

Alternatively, the power supply voltages are applied to the at least two power supply voltage input points on the power line via at least two external power supply leads, respectively.

Alternatively, the step of applying the power supply voltages to the at least two power supply voltage input points includes: applying the power supply voltages to the at least two power supply voltage input points on each power line on the display array substrate.

Alternatively, the power supply voltage is applied to the power supply voltage input points on different power lines via an identical external power supply lead.

The present disclosure further provides in one embodiment a display panel including the above-mentioned display array substrate.

The present disclosure further provides in one embodiment a display device including the above-mentioned display array substrate or display panel. The display device may be a liquid crystal display device or an OLED display device, e.g., a liquid crystal TV, a mobile phone, a liquid crystal display or an OLED display. Alternatively, the display device is an OLED display, so as to compensate for the IR voltage drop in a better manner.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:
1. A display array substrate, comprising:
pixels, wherein each pixel includes a light-emitting element;
first power lines for inputting current into light-emitting elements of the pixels;
second power lines for outputting the current from the light-emitting elements of the pixels; and
a voltage application unit, wherein:
the first power lines are connected to pixels in at least one column within an effective display region on the display array substrate,
the voltage application unit is arranged outside the effective display region and configured to apply power supply voltages to at least two power supply voltage input points on each first power line, for each first power line, an absolute value of a voltage difference between the at least two power supply voltage input points is less than a predetermined voltage threshold, the voltage application unit includes a direct current (DC) to DC converter and a DC voltage source configured to generate a DC voltage, an input end of the DC to DC (DC/DC) converter is configured to receive the DC voltage, the DC/DC converter includes at least two output ends corresponding to the at least two power supply voltage input points on each first power line, respectively, and the DC/DC converter is configured to generate a corresponding power supply voltage in accordance with an impedance between each output end and the corresponding power supply voltage input point, and apply the power supply voltage through the output end to the corresponding power supply voltage input point.

2. The display array substrate according to claim 1, wherein the pixels in each column within the effective display region are connected to a corresponding first power line; and the voltage application unit is configured to apply the power supply voltages to at least two power supply voltage input points on each first power line on the display array substrate.

3. The display array substrate according to claim 1, wherein when the power supply voltages are applied by the voltage application unit to two power supply voltage input points on the first power line, the two power supply voltage input points are located at a top and a bottom of the first power line, respectively.

4. The display array substrate according to claim 1, wherein when the power supply voltages are applied by the voltage application unit to three power supply voltage input points on the first power line, the three power supply voltage input points are located at a top, a middle, and a bottom of the first power line, respectively.

5. The display array substrate according to claim 1, wherein the voltage difference between the at least two power supply voltage input points is zero.

6. The display array substrate according to claim 1, wherein the DC/DC converter includes at least two DC/DC conversion units corresponding to the at least two power supply voltage input points, respectively; and each DC/DC conversion unit includes a low drop-out regulator, a positive phase input end of which is configured to receive the DC voltage, a negative phase input end of which is connected to an output end of the low drop-out regulator through a first divider resistor and grounded through a second divider resistor, and the output end of which is connected to the corresponding power supply voltage input point.

7. The display array substrate according to claim 1, wherein:

the voltage application unit includes at least two variable resistors corresponding to the at least two power supply voltage input points, respectively, and a DC voltage source for generating a DC voltage, and a first end of the variable resistor is configured to receive the DC voltage, and a second end of the variable resistor is connected to the corresponding power supply voltage input point.

8. The display array substrate according to claim 1, wherein the voltage application unit is further configured to apply the power supply voltages to the at least two power supply voltage input points on the first power line via at least two external power supply leads within a wiring region on the display array substrate.

9. The display array substrate according to claim 8, wherein a power supply voltage is applied to the power supply voltage input points on a plurality of different first power lines via an identical external power supply lead.

10. The display array substrate according to claim 9, wherein the display array substrate is an organic light-emitting diode (OLED) array substrate.

11. A compensation method for the display array substrate according to claim 1, the method comprising steps of:

enabling pixels in at least one column within an effective display region on the display array substrate to be connected to at least one first power line;

selecting at least two power supply voltage input points on each of the at least one first power line on the display array substrate; and applying power supply voltages to the at least two power supply voltage input points, an absolute value of a voltage difference between the at least two power supply voltage input points being less than a predetermined voltage threshold.

12. The compensation method according to claim 11, wherein when the power supply voltages are applied to two power supply voltage input points on the first power line, the two power supply voltage input points are located at a top and a bottom of the first power line, respectively.

13. The compensation method according to claim 11, wherein when the power supply voltages are applied to three power supply voltage input points on the first power line, the three power supply voltage input points are located at a top, a middle, and a bottom of the first power line, respectively.

14. The compensation method according to claim 11, wherein the voltage difference between the at least two power supply voltage input points is zero.

15. The compensation method according to claim 11, wherein the power supply voltages are applied to the at least two power supply voltage input points on the first power line via at least two external power supply leads, respectively.

16. The compensation method according to claim 11, wherein the step of applying the power supply voltages to the at least two power supply voltage input points includes applying the power supply voltages to the at least two power supply voltage input points on each first power line on the display array substrate.

17. The compensation method according to claim 16, wherein a power supply voltage is applied to the power supply voltage input points on a plurality of different first power lines via an identical external power supply lead.

18. A display panel, comprising the display array substrate according to claim 1.

19. A display device, comprising the display array substrate according to claim 1.

* * * * *